US009015449B2

(12) United States Patent
Bishop et al.

(10) Patent No.: US 9,015,449 B2
(45) Date of Patent: Apr. 21, 2015

(54) REGION-WEIGHTED ACCOUNTING OF MULTI-THREADED PROCESSOR CORE ACCORDING TO DISPATCH STATE

(75) Inventors: James Wilson Bishop, Newark Valley, NY (US); Michael J. Genden, Austin, TX (US); Steven Bradford Herndon, Endicott, NY (US); Philip Lee Vitale, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 1060 days.

(21) Appl. No.: 13/072,716

(22) Filed: Mar. 27, 2011

(65) Prior Publication Data

US 2012/0246447 A1    Sep. 27, 2012

(51) Int. Cl.
*G06F 9/46* (2006.01)
*G06F 9/38* (2006.01)
*G06F 9/30* (2006.01)

(52) U.S. Cl.
CPC .............. *G06F 9/46* (2013.01); *G06F 9/30101* (2013.01); *G06F 9/3851* (2013.01)

(58) Field of Classification Search
CPC combination set(s) only.
See application file for complete search history.

(56) References Cited

U.S. PATENT DOCUMENTS

| | | | |
|---|---|---|---|
| 6,223,204 B1 * | 4/2001 | Tucker ........................... | 718/103 |
| 6,549,930 B1 | 4/2003 | Chrysos et al. ................ | 709/104 |
| 6,658,447 B2 * | 12/2003 | Cota-Robles ................. | 718/103 |
| 7,472,390 B2 | 12/2008 | O'Connor et al. ............. | 718/104 |
| 7,478,198 B2 | 1/2009 | Latorre et al. ................ | 711/125 |
| 7,603,545 B2 | 10/2009 | Sunayama et al. ............ | 712/234 |
| 7,752,627 B2 | 7/2010 | Jones et al. .................... | 718/105 |
| 7,765,387 B2 | 7/2010 | Sunayama et al. ............ | 712/233 |
| 8,161,493 B2 * | 4/2012 | Floyd et al. .................... | 718/108 |
| 2001/0047468 A1 * | 11/2001 | Parady .......................... | 712/228 |
| 2004/0010667 A1 * | 1/2004 | Brenner ........................ | 711/158 |
| 2006/0037025 A1 * | 2/2006 | Janssen et al. ................ | 718/107 |
| 2006/0059487 A1 * | 3/2006 | Chatterjee et al. ............ | 718/100 |
| 2006/0130062 A1 * | 6/2006 | Burdick et al. ............... | 718/100 |
| 2006/0173665 A1 | 8/2006 | Arndt et al. ...................... | 703/14 |
| 2009/0089782 A1 * | 4/2009 | Johnson et al. ............... | 718/100 |
| 2009/0125909 A1 * | 5/2009 | Li et al. .......................... | 718/103 |
| 2009/0313455 A1 * | 12/2009 | Mansell et al. ............... | 712/207 |
| 2010/0083267 A1 * | 4/2010 | Adachi et al. ................. | 718/103 |
| 2010/0287561 A1 * | 11/2010 | Floyd et al. .................... | 718/108 |

FOREIGN PATENT DOCUMENTS

CN         1239249 A    12/1999      ............. G06F 15/00

OTHER PUBLICATIONS

Li, Tong, et al., Efficient and Scalable Multiprocessor Fair Scheduling Using Distributed Weighted Round-Robin, 2009, ACM, pp. 65-74.*
Office Action for U.S. Appl. No. 14/065,617 (Bishop, "Region-Weighted Accounting of Multi-Threaded Processor Core According to Dispatch State," filed Oct. 29, 2013), U.S. Patent and Trademark Office, mailed Nov. 19, 2014, 16 pages.

* cited by examiner

*Primary Examiner* — Eric Coleman
(74) *Attorney, Agent, or Firm* — VanLeeuwen & VanLeeuwen; Steven L. Bennett

(57) ABSTRACT

An approach is provided in which a thread is selected from multiple active threads, along with a corresponding weighting value. Computational logic determines whether one of the multiple threads is dispatching an instruction and, if so, computes a dispatch weighting value using the selected weighting value and a dispatch factor that indicates a weighting adjustment of the selected weighting value. In turn, a resource utilization value of the selected thread is computed using the dispatch weighting value.

21 Claims, 11 Drawing Sheets

400

| RWMR Register Fields | | |
|---|---|---|
| Bits | Single LPAR Mode | Multi-LPAR Mode |
| 0 | n/a | n/a |
| 1-3 | Dispatch Factor Field | Dispatch Factor Field |
| 4-7 | RF1 | n/a |
| 8-11 | RF2 | n/a |
| 12-15 | RF3 | n/a |
| 16-20 | RF4 | RF4(RF1-LPAR0) |
| 21-25 | RF5 | n/a |
| 26-30 | RF6 | RF6(RF1-LPAR1) |
| 31-35 | RF7 | n/a |
| 36-40 | RF8 | RF8(RF1-LPAR2) |
| 41-45 | RF9 | n/a |
| 46-50 | RF10 | RF10 (RF1-LPAR3) |
| 51-55 | RF11 | n/a |
| 56-59 | RF12 | n/a |
| 60-63 | RF13 | n/a |

| Thread Number | Active | Run/ Idle | Round Robin Sequence ||||||| 
| | | | 1 | 2 | 3 D | 4 | 5 | 6 | 7 D |
|---|---|---|---|---|---|---|---|---|---|
| 0 | Y | Run | 28 | | | 56 | | | 88 |
| 1 | Y | Run | | 28 | | | 56 | | |
| 2 | Y | Run | | | 32 | | | 60 | |
| 3 | Y | Idle | 36 | | | 72 | | | |
| 4 | Y | Idle | | 36 | | | | 72 | |
| 5 | Y | Idle | | | 32 | | | | 64 |
| 6 | Y | Idle | | | | 36 | | | |
| 7 | N | n/a | | | | | | | |

REGION-WEIGHTED ACCOUNTING OF MULTI-THREADED PROCESSOR CORE ACCORDING TO DISPATCH STATE

BACKGROUND

The present disclosure relates to multi-threaded processor core accounting, and more specifically relates to efficiently computing thread resource utilization during dispatch cycles. Today's processors may be superscalar in nature such that a single processor decodes, dispatches, and executes multiple instructions on each processor cycle. These processors may also support simultaneous multi-threading (SMT) modes, which allows a processor to concurrently execute more than one software program (thread) at a time.

BRIEF SUMMARY

According to one embodiment of the present disclosure, an approach is provided in which a thread is selected from multiple active threads, along with a corresponding weighting value. Computational logic determines whether one of the multiple threads is dispatching an instruction and, if so, computes a dispatch weighting value using the selected weighting value and a dispatch factor that indicates a weighting adjustment of the selected weighting value. In turn, a resource utilization value of the selected thread is computed using the dispatch weighting value.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present disclosure, as defined solely by the claims, will become apparent in the non-limiting detailed description set forth below.

BRIEF DESCRIPTION OF THE SEVERAL VIEWS OF THE DRAWINGS

The present disclosure may be better understood, and its numerous objects, features, and advantages made apparent to those skilled in the art by referencing the accompanying drawings, wherein:

FIG. 4 is a table showing region-weighted mode register (RWMR) partitioned into multiple register fields and a dispatch factor field, as well as the RWMR being reassigned to support Single LPAR and simultaneous multiple LPAR operation;

FIG. 9 is a table showing a distributed cycle round robin sequence that adds weighting values to active threads over time;

DETAILED DESCRIPTION

Figure 1:
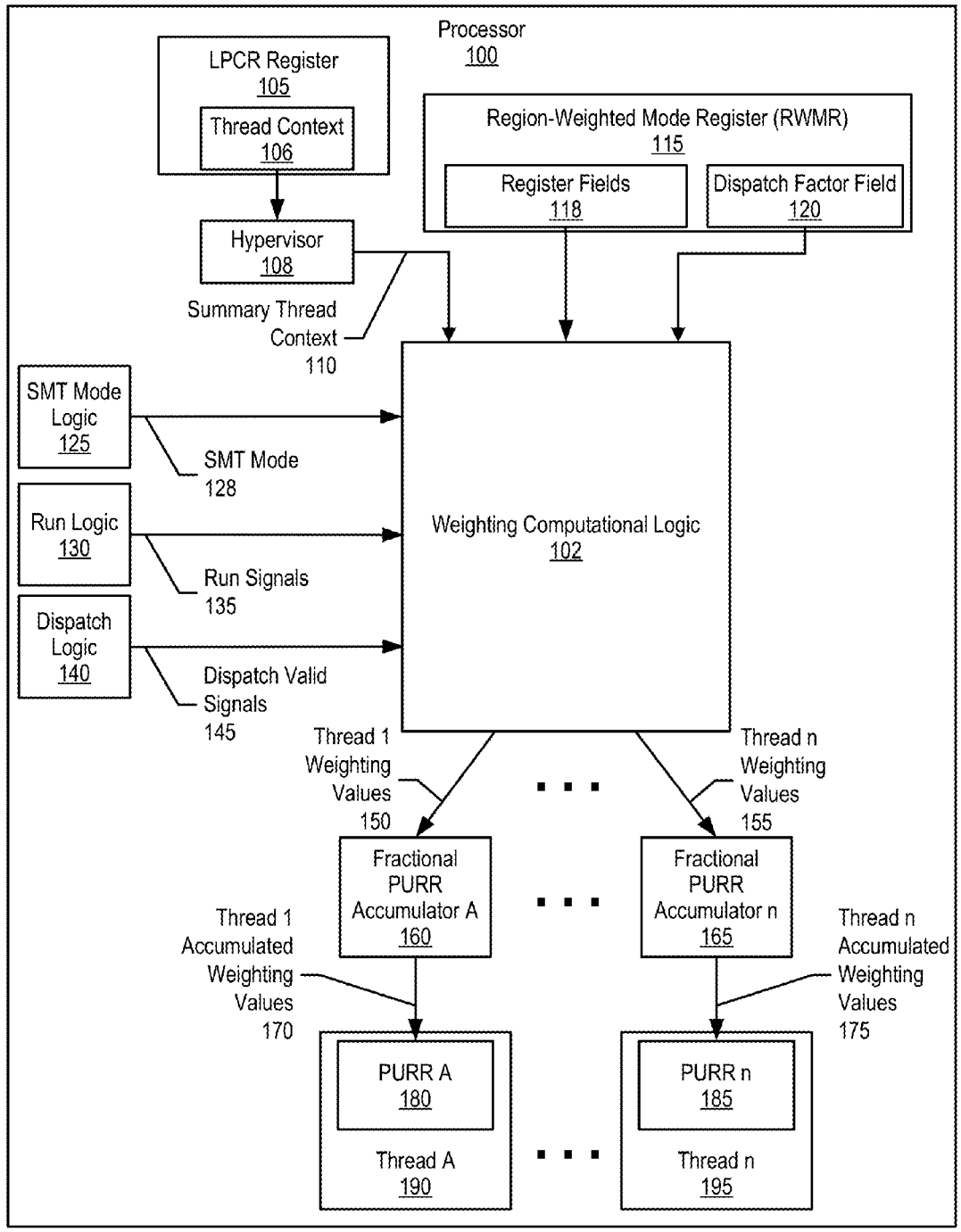
FIG. 1 is a diagram showing a processor tracking resource utilization by computing dispatch weighting values during a dispatch cycle using a dispatch factor.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The following detailed description will generally follow the summary of the disclosure, as set forth above, further explaining and expanding the definitions of the various aspects and embodiments of the disclosure as necessary.

FIG. 1 is a diagram showing a processor tracking resource utilization by computing dispatch weighting values during a dispatch cycle using a dispatch factor. Processor 100 includes weighting computational logic 102, which receives various inputs to compute weighting values for active threads. These weighting values are stored in fractional PURR (processor utilization resource register) accumulators 160-165, which are eventually stored in their corresponding thread's (threads 190-195) processor utilization resource register (PURR 180-185). In turn, processor 100 tracks resource utilization on a per-thread basis. As those skilled in the art can appreciate, weighting computational logic 102 may comprise hardware logic, software code, or a combination of hardware logic and software code.

Region-weighted mode register (RWMR) 115 includes register fields 118. Register fields 118 includes multiple register fields, each of which stores a particular non-dispatch weighting value for use by weighting computational logic 102 based upon processor 100's operating environment (e.g., the number of active threads, the number of running threads, etc). In one embodiment, register fields 118 includes thirteen different weighting values that are stored in thirteen different register fields (see FIG. 4 and corresponding text for further details).

RWMR 115 also includes dispatch factor field 120 that stores a dispatch factor. Weighting computational logic 102 decreases or increases retrieved weighting values (stored in register fields 118) using the dispatch factor when one or more active threads dispatches an instruction. As such, RWMR 115 does not store separate dispatch weighting values for each of the non-dispatch weighting values included in register fields 118, thus reducing the size of RWMR 115.

In one embodiment, register fields 118 include run weighting values, which are applied to threads in a run state. In this embodiment, weighting computational logic 102 uses the run weighting values to compute idle weighting values, which are applied to threads in an idle state. In another embodiment, register fields 118 include idle weighting values, which are applied to threads in an idle state. In this embodiment, weighting computational logic 102 uses the run weighting values to compute run weighting values, which are applied to threads in an idle state.

In yet another embodiment, in order to minimize the number of bits required for register fields 118, weighting values may include a combination of run weighting values and idle weighting values. In this embodiment, register fields 118 includes run weighting values for times at which processor 100's operating environment has a large number of threads in the run state (4-8 threads). Continuing with this embodiment, register fields 118 includes idle weighting values for times at which processor 100's operating environment has a small number of threads are in the run state (1-3 threads) (see FIG. 3 and corresponding text for further details).

In one embodiment, a processor designates a run latch status bit for each hardware thread. In this embodiment, when an operating system enters an idle state, or if a thread is suspended, the run latch for that particular thread is disabled (each run latch signal operates independently). In this embodiment, major regions of hardware thread concurrency may be defined by the number and location of threads that have their corresponding run latch asserted. As such, the run latch state guides idle and non-idle weighting values to appropriate Fractional PURR Accumulators.

Weighting computational logic 102 uses several inputs to identify which register field from register fields 118 to retrieve a specific weighting value. One input used by weighting computational logic 102 to identify the register field is summary thread context 110. Summary thread context 110 provides an indication to weighting computational logic 102 of the number of active threads. In one embodiment, summary thread context 110 indicates a "ceiling" on the number of hardware threads that are readily available to an operating system. The concept of thread context allows a processor to decouple dynamic changes in an SMT core mode from the context in which a user wishes to evaluate utilization. Summary thread context 110 may also be used to determine whether to accumulate idle PURR counts for threads that are suspended (e.g., in NAP mode).

Hypervisor 108 receives thread context 106 included in logical partitioning control register (LPCR) 105, which are individual bits (e.g., bits 0-7) that indicate which threads are active (online). In turn, hypervisor 108 interprets these bits and provides summary thread context 110. In one embodiment, hypervisor 108 uses the following criteria to determine summary thread context 110:

1 thread active: Summary Thread Context 1;
2 threads active: Summary Thread Context 2;
3-4 threads active: Summary Thread Context 4;
5-8 threads active: Summary Thread Context 8.

Another input that weighting computational logic 102 uses to identify the register field is simultaneous multithreading (SMT) mode 128. SMT mode logic 125 monitors the number of interrupts and sleeps that occurs in processor 100 and sets the SMT mode accordingly, which defines the resources allocated and the number of threads that are active (running or idle). In one embodiment, SMT mode 128 may be SMT1 (up to one thread active), SMT2 (up to two threads active), SMT4 (up to four threads active), and SMT8 (up to 8 threads active).

Weighting computational logic 102 also uses run signals 135 (provided by run logic 130) to determine whether to apply, for each particular thread, a run weighting value or an idle weighting value. Run signals 135 identify which threads are in the "run" state. For example, assuming that threads 0-4 are active and run signals 135 indicate that threads 0 and 1 are in the run state, weighting computational logic 102 knows to compute a run weighting value for threads 0 and 1, and compute an idle weighting value for threads 2-4 (or a dispatch run weighting value/dispatch idle weighting value when one or more active threads executes a dispatch instruction as discussed below).

Dispatch logic 140 includes dispatch valid signals 145, which indicate whether one or more active threads are dispatching an instruction. As such, weighting computational logic 102 determines whether to use dispatch factor 120 to compute dispatch run weighting values and dispatch idle weighting values. In one embodiment, a particular thread does not need to be dispatching an instruction to receive a dispatch weighting value. Rather, when any one of the active threads is dispatching an instruction, each of the active threads receives either a dispatch run weighting value or a dispatch idle weight value. Using the example above and assuming thread 0 is dispatching an instruction, both thread 0 and thread 1 receive a dispatch run weighting value (because they are both in the run state). In this example, threads 2-4 would receive a dispatch idle weighting value.

At particular intervals (e.g., processor clock cycle), weighting computational logic 102 computes and stores a "fractional" weighting value in each active thread's corresponding fractional PURR accumulator (accumulators 160-165). In due course, these fractional weighting values are stored as accumulated values (values 170-175) in their corresponding thread's PURR (180-185). In one embodiment, weighting computational logic 102 uses a distributed cycle round robin sequence to add weighting values to threads over time. In this embodiment, the distributed cycle round robin sequence uses pointers (one for run threads and one for idle threads) to track which thread to add weighting values for a particular cycle (see FIGS. 8-9 and corresponding text for further details). In one embodiment, weighting computational logic 102 utilizes the entirety of the inputs discussed above, including multiple RWMR fields, in order to accurately model the performance and resource utilization of the processor 100.

Figure 2:
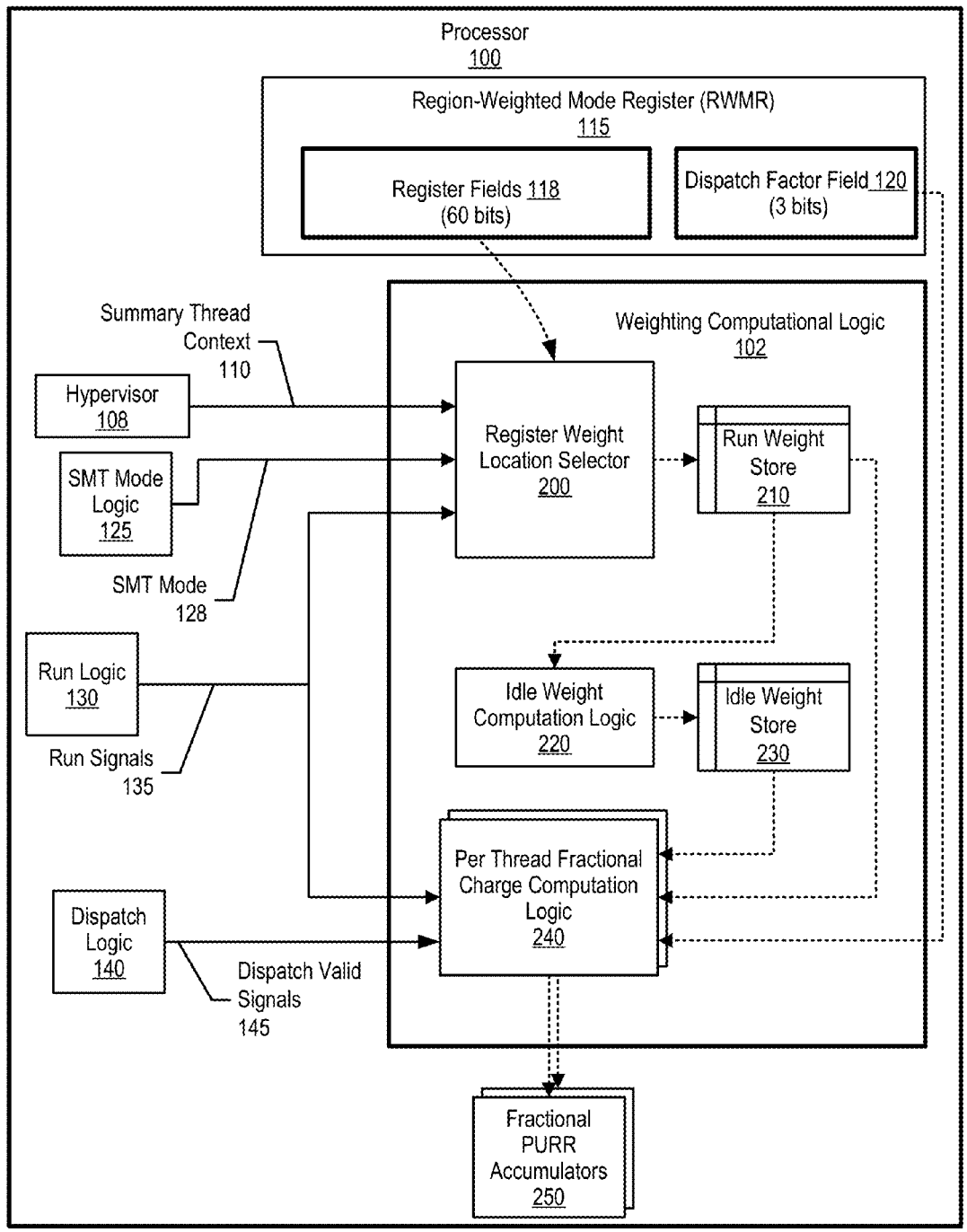
FIG. 2 is a diagram showing an embodiment of weighting computational logic 102 that generates weighting values based upon a processor's operating environment and whether a thread dispatches an instruction.

FIG. 2 is a diagram showing an embodiment of weighting computational logic 102 that generates weighting values based upon a processor's operating environment and whether a thread dispatches an instruction. Weighting computational logic 102 includes register weight location selector 200, which uses summary thread context 110, SMT mode 128, and run signals 135 to identify register field in register fields 118 and retrieve a corresponding weighting value. The example in FIG. 2 pertains to an embodiment when RWMR 115 includes run weighting values (as opposed to idle weighting values).

Register weight location selector 200 identifies processor 100's summary thread context via summary thread context 110, and identifies processor 100's SMT mode via SMT mode 128. In turn, register weight location selector 200 identifies the number of threads in the run state via run signals 135. With this information, register weight location selector 200 identifies a particular register field; retrieves a run weighting value from the identified register field, and stores the run weighting value in run weight store 210 (see FIG. 3 and corresponding text for further details).

In turn, idle weight computational logic 220 uses the run weighting value to compute an idle weighting value, which it stores in idle weight store 230. For example, assuming that eight threads are active (SMT8); six threads are in the run state, and the stored run weighting value (per thread) is 9/64:

Total run weighting value (6 threads): 6*9/64=54/64;
Total idle weighting value: 64/64−54/64=10/64
Per Thread Idle weighting value (2 threads): (10/64)/2=5/64

When one of the active threads is dispatching an instruction (indicated by dispatch valid signals 145), per thread fractional charge computation logic 240 computes dispatch run weighting values and idle weighting values using a dispatch factor stored in dispatch factor field 120. Continuing with the example above, assuming that the dispatch factor is 1/16, per thread fractional charge computation logic 240 multiplies the run weighting value by 1 1/16:

Per Thread Dispatch run weighting value: (17/16*9)/64=10/64;
Total Dispatch run weighting value: 6*10/64=60/64;
Total dispatch idle weighting value: 64/64−60/64=4/64
Per Thread Dispatch Idle weighting value (2 threads): (4/64)/2=2/64

As disclosed herein, dispatch run weighting values may be rounded off to a maximum value if they exceed the maximum value. Likewise, dispatch idle weighting values may be rounded off to a minimum value (e.g., 0) if they fall below the minimum value.

Along with determining whether a dispatch is occurring (via dispatch valid signals 145), per thread fractional charge computation logic 240 identifies which threads are in the run state (via run signals 135) and stores (dispatch) run weighting values in the identified threads' corresponding fractional PURR accumulators 250. Likewise, per thread fractional charge computation logic 240 identifies which threads are in the idle state (via run signals 135) and stores (dispatch) idle weighting values in the identified threads' corresponding fractional PURR accumulators 250.

Figure 3:
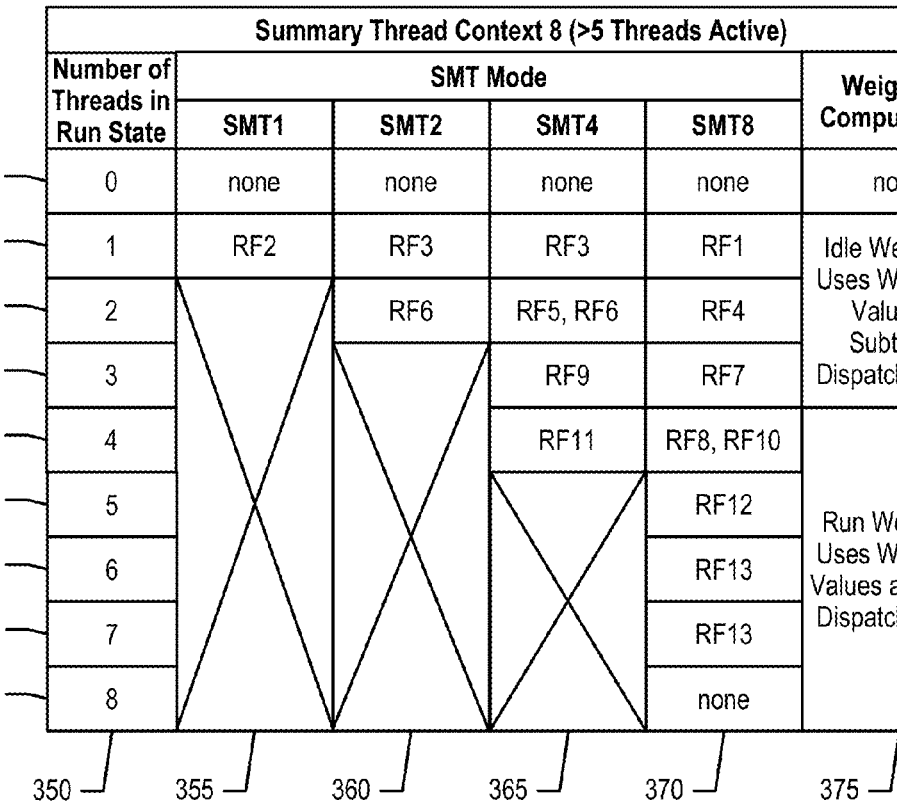
FIG. 3 is a table showing relationships between processor modes and register fields for which to retrieve a weighting value.

FIG. 3 is a table showing relationships between processor modes and register fields for which to retrieve a weighting value. In one embodiment a particular register field is selected based upon three criteria, which are the summary thread context (depends upon the number of active threads), the number of threads running, and the SMT mode. Once the register field is selected, the weighting value for a particular thread is based upon the retrieved weighting value from the selected register field; whether the thread is in a run state or idle state; and whether one of the threads dispatches an instruction (on one of the active threads).

Table 300 corresponds to an embodiment of a hypervisor identifying a summary thread context of "8." Other embodiment tables are not included in this disclosure (e.g., for summary context of 1, 2, 4, etc.) for simplicity purposes. In addition, table 300 is just one example of assigning register fields based upon the number of threads running and a particular SMT mode.

Rows 305-345 correspond to the number of threads in the run state (column 350). In one embodiment, in order to save RWMR field bits while still providing a potentially large value to the running thread, register fields may include a combination of run weighting values and idle weighting values. In this embodiment, the register fields include run weighting values for times at which processor 100's operating environment has a large number of threads in the run state (4-8 threads), and includes idle weighting values for times at which processor 100's operating environment has a small number of threads are in the run state (1-3 threads). In this embodiment, regarding a small number of running threads, the corresponding register field may include a small value in a 4-bit field, which gives running thread(s) a large value (e.g., 50 decimal). Otherwise, more bits are required to represent large values for running threads (thus larger registers). Likewise, when a larger number of running threads are available (4 or more), the weighting value is used for the run weighting value since there are enough bits times number of running threads to achieve large values. In either case, the total count of run weighting values and idle weighting values add to 64/64 (includes dispatch run weighting values and dispatch idle weighting values).

Column 355 shows that when processor 100 is in SMT1 mode, a valid number of running threads is 0 or 1. Column 360 shows that when processor 100 is in SMT2 mode, a valid number of running threads is between 0-2. Column 365 shows that when processor 100 is in SMT4 mode, a valid number of running threads is between 0-4. And, column 370 shows that when processor 100 is in SMT8 mode, a valid number of running threads is between 0-8.

Figure 7:
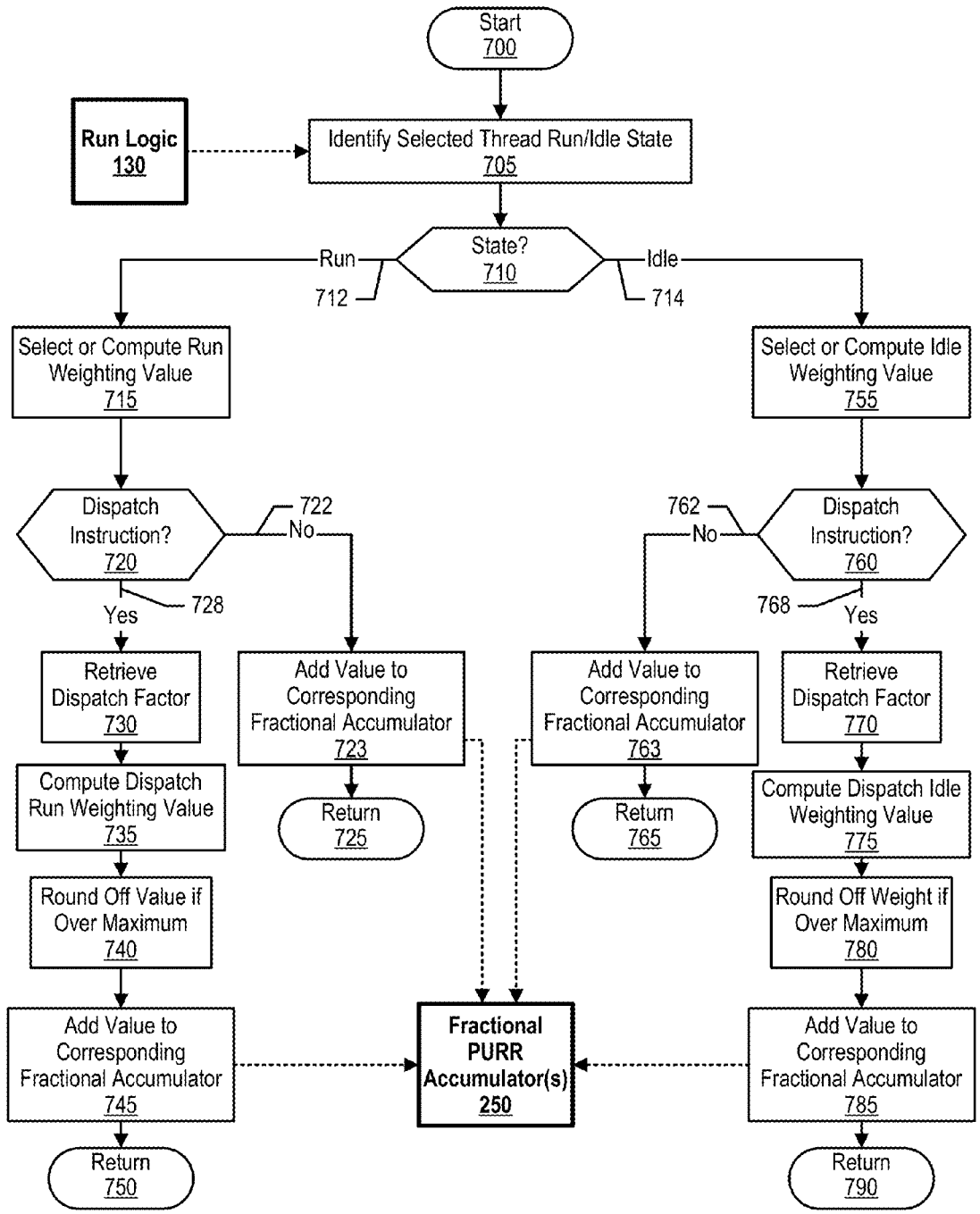
FIG. 7 is a flowchart showing steps taken in computing a fractional weighting value for a selected thread.

As an example of using weighting values, assume that the system is in summary thread context 8, SMT2 mode, and one thread is running (row 310). Table 300 shows to retrieve a weighting value from register field "RF3" and use the weighting value (WV3) as an idle weighting value (column 375). As such:

Idle Weighting Value=WV3
Non-Dispatch Idle Weighting Value=(WV3)×(online thread count−run thread count)
Dispatch Idle Weighting Value=(WV3−Dispatch Factor)×(online thread count−run thread count)
Non-Dispatch Run Weighting Value=64−(Non-Dispatch Idle Weighting Value)
Dispatch Run Weighting Value=64−Dispatch Idle Weighting Value As another example of using weighting values, assume that the system is in summary thread context 8, SMT8 mode, and five threads are running (row 330). Table 300 shows to retrieve a weighting value from register field "RF12" and use the corresponding weighting value (WV12) as a run weighting value (column 375). As such:

Run Weighting Value=WV12
Non-Dispatch Run Weighting Value=(WV12)×(run thread count)
Dispatch Run Weighting Value=(WV12+Dispatch Factor)×(run thread count)
Non-Dispatch Idle Weighting Value=64−(Non-Dispatch Run Weighting Value)
Dispatch Idle Weighting Value=64−Dispatch Run Weighting Value As discussed herein, when a dispatch run weighting value or dispatch idle weighting value exceeds a maximum/minimum value (based on the number of threads), such values will be rounded off accordingly (see FIG. 7 and corresponding text for further details).

A few of table 300's cells include two register fields (SMT8, 4 threads running). For these processing environments, weighting values from a particular register location may be used based upon which regions the threads are active. For example, if four threads are running in the same region, then the weighting value from RF8 is used. If two threads are running in one region, and the other two threads are running in a different region, then the weighting value from RF10 is used. This is because different regions may be used to best match the expected performance of a processor for a particular state and resource allocation. In one embodiment, a maximum of thirteen regions are defined as the best match to differing machine performance regions relative to bits used in defining the region values.

FIG. 4 is a table showing region-weighted mode register partitioned into multiple register fields (RF1-RF13) and a dispatch factor field. Table 400 shows that the dispatch factor value is stored in bits 1-3, whether a system is in a single logical partition (LPAR) mode (column 420) or a multi-LPAR mode (e.g., 4-LPAR) (column 430) (see FIG. 5 and corresponding text for further details). As can be seen, when a system is in multi-LPAR mode, the RWMR uses some of the same register fields (RF4, RF6, RF8, and RF10) to store weighting values as it does for the single LPAR mode.

Figure 5:
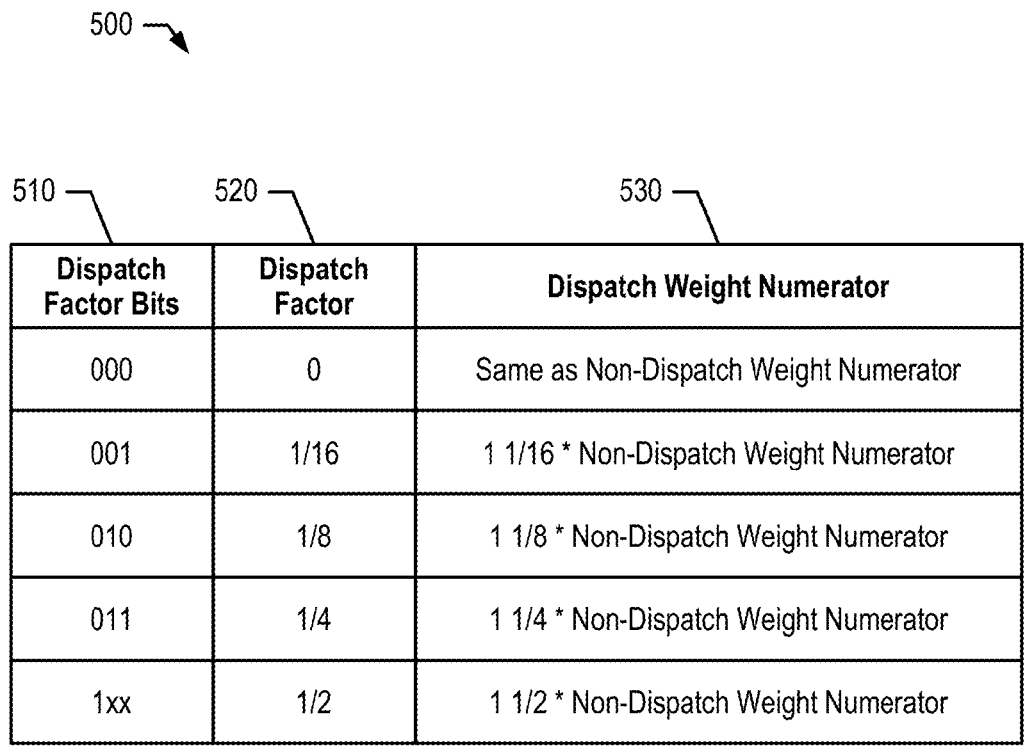
FIG. 5 is a table showing a relationship between dispatch factor bits, a dispatch factor, and a dispatch weighting value numerator.

FIG. 5 is a table showing a relationship between dispatch factor bits (included in dispatch factor field 120), a dispatch factor, and a dispatch weighting value numerator. Table 500 shows, in one embodiment, that the dispatch factor may be represented by three bits (column 510). As those skilled in the art may appreciate, more or less bits may be used based upon the required dispatch factor resolution. Column 520 shows dispatch factor values that correspond to the various bit values shown in column 510, and column 530 shows an embodiment of computing dispatch weightings based on the dispatch factor. For example, when the dispatch factor is ¼, a dispatch run weighting value may be computed by multiplying the run weighting value's numerator by 1¼ (5/4). In this example, assuming a run weighting value is 4/64, the dispatch run weighting value is [(5/4)*4]/64, which equals 5/64. In one embodiment, computational logic may compute a dispatch fraction (1/4*4/64=1/64) and add the dispatch fraction to the weighting value to compute the dispatch run weighting value (1/64+4/64=5/64).

Figure 6:
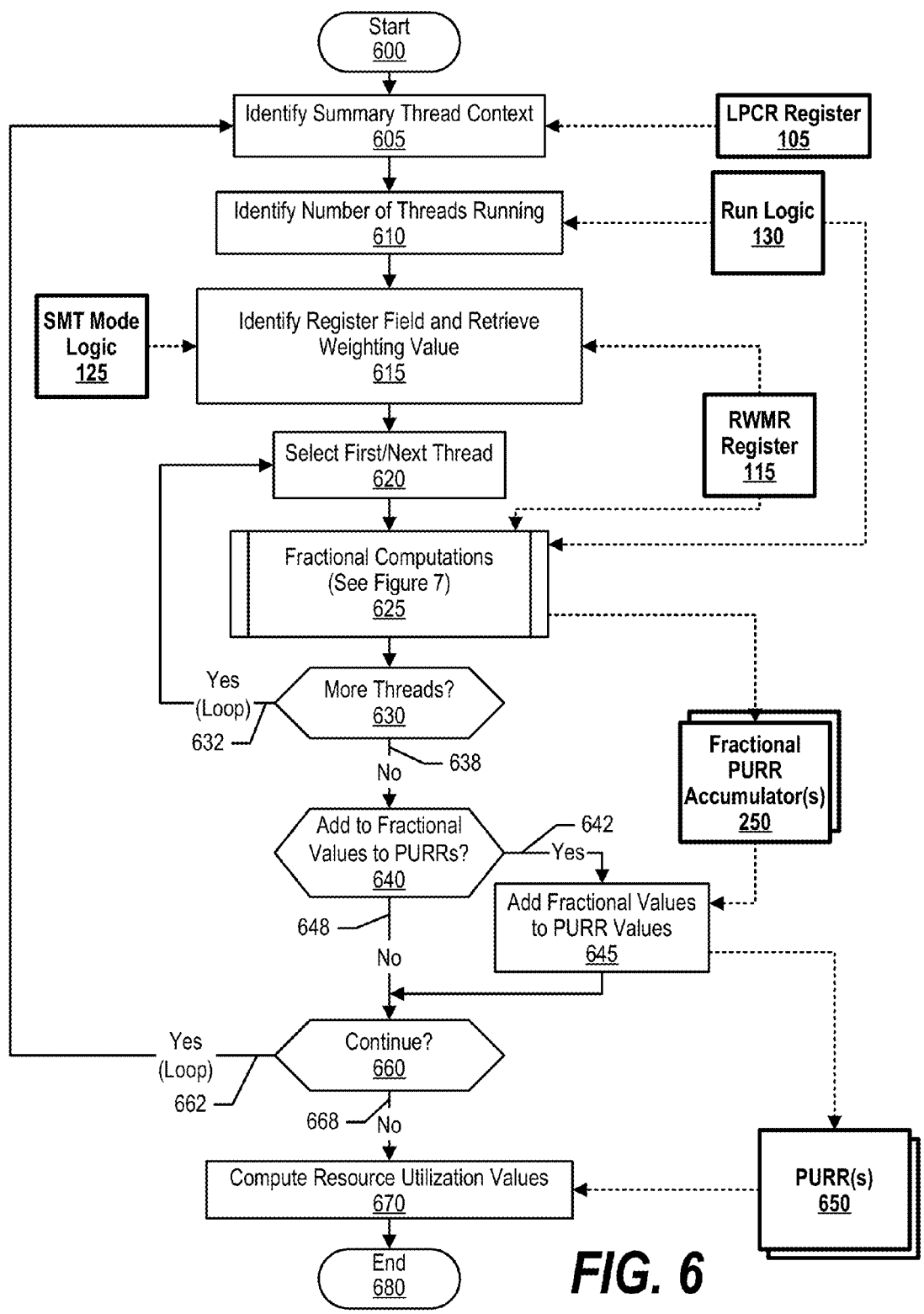
FIG. 6 is a flowchart showing steps taken in computing resource utilization values on a per thread basis.

FIG. 6 is a flowchart showing steps taken in computing resource utilization values on a per thread basis. The steps shown in FIG. 6 may be performed using software, firmware, or hardware (e.g., FIGS. 1 and 2). Processing commences at 600, whereupon processing identifies a summary thread context based upon thread context information stored in LPCR register 105 (step 605). As discussed herein, in one embodiment, the summary thread context may be 1, 2, 4, or 8, depending upon the number of active threads. In this embodiment:

1 thread active: Summary Thread Context 1;
2 threads active: Summary Thread Context 2;
3-4 threads active: Summary Thread Context 4;
5-8 threads active: Summary Thread Context 8.

At step 610, processing identifies the number of threads that are running (vs. number of threads that are idle). Processing, at step 615, identifies a register location in and retrieves a weighting value from RWMR register 115 based upon the summary thread context, the number of threads running, and the simultaneous multi-thread (SMT) mode set by SMT mode logic 125 (see FIG. 3 and corresponding text for further details). As discussed earlier, SMT mode logic sets an SMT mode of SMT1, SMT2, SMT4, or SMT8 based upon the amount of interrupts and sleep commands in processor 100. In one embodiment, RWMR register 115 may include idle weighting values instead of run weighting values. In this embodiment, processing retrieves an idle weighting value based upon the summary thread context, the number of threads idle, and the SMT mode set by SMT mode logic 125.

Processing selects a first thread at step 620, and proceeds to compute/store a fractional weighting value for the selected thread based upon the thread's state (idle state or a run state), and whether one of the active threads is dispatching an instruction. Processing then stores the fractional weighting value in one of fractional PURR accumulators 250 that correspond to the selected thread (pre-defined process block 625, see FIG. 7 and corresponding text for further details). In one embodiment, processing utilizes a distributed round robin sequence that iteratively selects different threads and stores fractional weighting values accordingly (see FIGS. 8-9 and corresponding text for further details).

A determination is made as to whether there are more active threads for which to compute a fractional weighting value (decision 630). For example, if three threads are active (e.g., 1 running and 2 idle), processing loops back to compute a fractional weighting value for all three threads. In one embodiment, such as a hardware embodiment similar to that shown in FIG. 1, a processor may concurrently compute fractional weighting values for each active thread.

If there are more threads for which to compute a fractional weighting value, decision 630 branches to "Yes" branch 632, whereupon processing loops back to select the next active thread and compute/store a fractional weighting value for the selected thread. This looping continues until processing computes/stores a fractional weighting value for each thread, at which point decision 630 branches to "No" branch 638.

A determination is made as to whether to add the fractional weighting values included in fractional PURR accumulators 250 to the accumulated weighting values stored in PURRs 650 (decision 640). For example, processing may add the fractional weighting values in PURRs 650 every 100 clock cycles. If processing should add the fractional weighting values in PURRs 650, decision 640 branches to "Yes" branch 642, whereupon processing adds the fractional weighting values from fractional PURR accumulators 250 to corresponding PURRs 650. On the other hand, if processing should not add the fractional weighting factors to PURRs 650 at this time, processing branches to "No" branch 648, bypassing step 645.

A determination is made as to whether to continue to compute thread fractional weighting values (decision 660). If processing should continue, decision 660 branches to "Yes" branch 662, which loops back to continue computing fractional weighting values. This looping continues until processing stops computing fractional weighting values, at which point decision 660 branches to "No" branch 668. Processing, at step 670, computes resource utilization values for each of the active threads based upon the values included in PURRs 650, and processing ends at 670.

FIG. 7 is a flowchart showing steps taken in computing a fractional weighting value for a selected thread. Processing commences at 700, whereupon processing identifies a thread state (e.g., idle state or run state) of the thread that was selected in FIG. 6 (step 620). A determination is made as to whether the thread state is a run state or idle state (decision 710). If the selected thread is in the run state, decision 710 branches to "Run" branch 712, whereupon processing selects or computes a run weighting value using the weighting value that was retrieved in step 615 shown in FIG. 6, depending on whether the retrieved weighting value is a run weighting value or an idle weighting value (step 715).

A determination is made as to whether one of the active threads is dispatching an instruction (decision 720). For example, processing may use dispatch valid signals 145 shown in FIG. 1 to make such determination. If no dispatch is occurring, decision 720 branches to "No" branch 722, whereupon processing adds the run weighting value (from step 715) to a corresponding fractional PURR accumulator 250 at step 723 (e.g., to thread 1's fractional PURR accumulator). Processing returns at 725.

On the other hand, if one of the active threads is dispatching an instruction (not necessarily the selected thread), decision 720 branches to "Yes" branch 728, whereupon processing retrieves a dispatch factor, such as from dispatch factor field 120 shown in FIG. 1 (step 730). At step 735, processing computes a dispatch run weighting value based upon the dispatch factor and the run weighting value from step 715. For example, if the dispatch factor is 1/4, then processing multiplies the run weight value's numerator by 11/4 (see FIG. 5 and corresponding text for further details).

At step 740, processing rounds off the dispatch run weighting value if it is over a maximum. For example, assuming six running threads; the dispatch factor is 1/4; and the run weighting value is 9/64; then the calculated dispatch run weighting value=(9*11/4)/64=11/64. Since six threads are running, each thread is allowed a maximum weighting of 10/64 (6*10/64=60/64), which is the largest value without overflowing 64/64. Therefore, in this example, processing rounds off the dispatch run weighting value from 11/64 to 10/64.

At step 745, processing adds the dispatch run weighting value to one of fractional PURR accumulators 250 that correspond to the selected thread, and processing returns at 750.

Referring back to decision 710, If the selected thread is in the idle state, decision 710 branches to "Idle" branch 714, whereupon processing selects or computes an idle weighting value using the weighting value that was retrieved in step 615 shown in FIG. 6 (step 755). A determination is made as to whether one of the active threads is dispatching an instruction (decision 760). If no dispatch is occurring, decision 760 branches to "No" branch 762, whereupon processing adds the idle weighting value (from step 755) to a corresponding fractional PURR accumulator 250 at step 763. Processing returns at 765.

On the other hand, if one of the active threads is dispatching an instruction, decision 760 branches to "Yes" branch 768, whereupon processing retrieves the dispatch factor at step 770. At step 775, processing computes a dispatch idle weighting value based upon the dispatch factor and the idle weighting value from step 715.

At step 780, processing rounds off the dispatch run weighting value if it is over a maximum and, at step 785, processing adds the dispatch idle weighting value to one of fractional PURR accumulators 250 that correspond to the selected thread. Processing returns at 790.

In one embodiment, different weightings are computed once (e.g., run weighting value, idle weighting value, dispatch run weighting value, dispatch idle weighting value) and stored in corresponding fractional PURR accumulators 250 based on each thread's condition (idle, run, dispatch, etc.)

Figure 8:
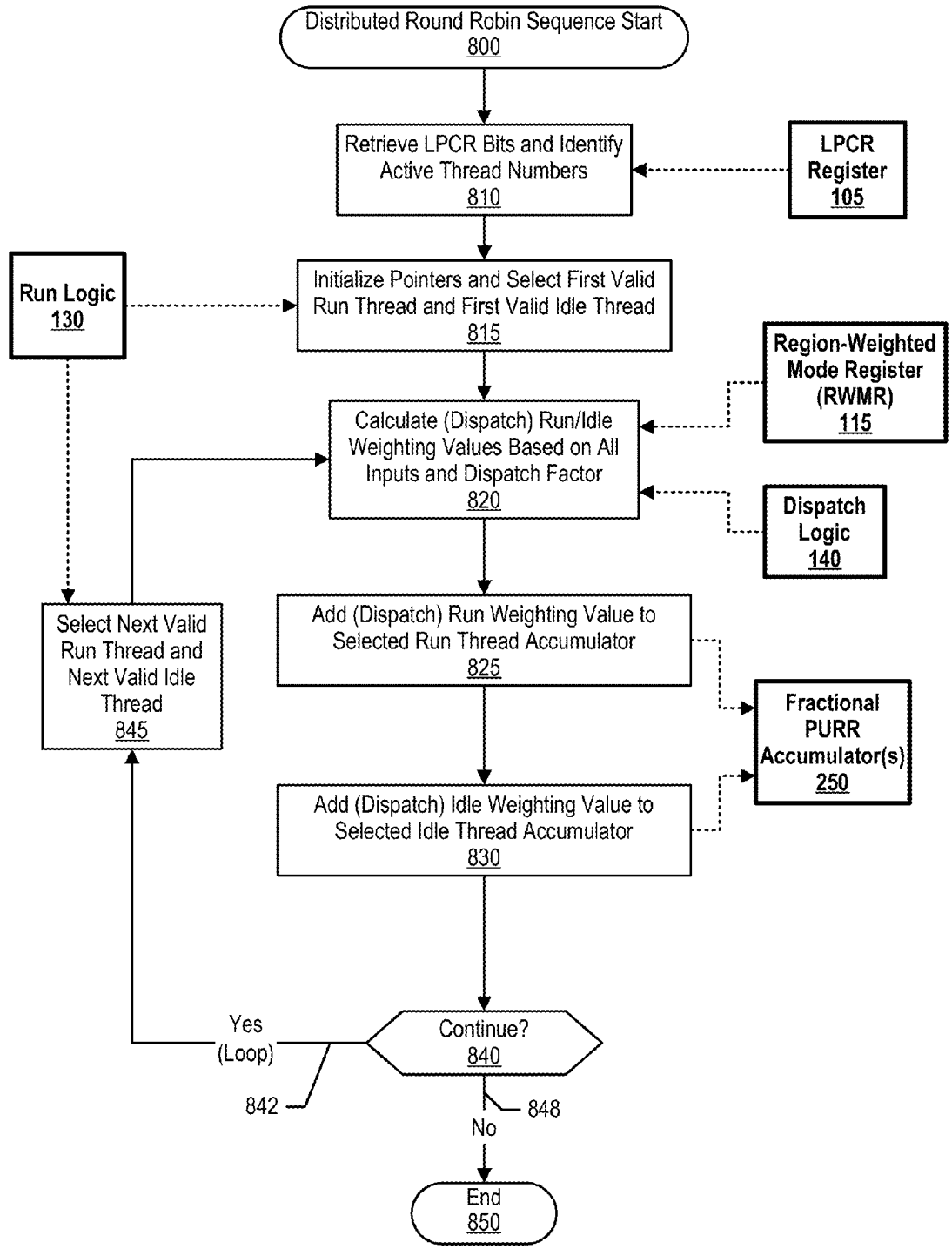
FIG. 8 is a flowchart showing steps taken in computing fractional weighting values and adding the fractional weighting values to fractional accumulators using a distributed round robin sequence.

FIG. 8 is a flowchart showing steps taken in computing fractional weighting values and adding the fractional weighting values to fractional accumulators using a distributed round robin sequence (see FIG. 9 and corresponding text for further details). Processing commences at 800, whereupon processing retrieves LPCR bits from LPCR register 105, which identifies the number of active threads. At step 815, processing initializes pointers (e.g., a run thread pointer and an idle thread pointer), and selects a first valid run thread and a first valid idle thread based on run logic 130 (indicates which threads that are in a run state).

At step 820, processing calculates run weighting values and idle weighting values (or dispatch run weighting values and dispatch idle weighting values if one of threads is dispatching an instruction via dispatch logic 140). These values are based on the weighting value retrieved from RWMR 115 (based on SMT mode and number of threads running). At step 825, processing adds the run weighting value to one of fractional PURR accumulators 250 corresponding to a run thread identified by the run thread pointer. Next, at step 830, processing adds the idle weighting value to one of fractional PURR accumulators 250 corresponding to an idle thread identified by the idle thread pointer. The example in FIG. 9 shows threads 0, 1, and 2 are running, while threads 3-6 are idle. In this example, the run thread pointer is initially pointing at thread 0 (first running thread) and the idle thread pointer is initially pointing at thread 3 (first idle thread). Column 960 shows that the run weighting value is added to thread 0's fractional PURR accumulator, and the idle weighting value is added to thread 3's fractional PURR accumulator.

A determination is made as to whether to continue the distributed round robin sequence (decision 840). If the distributed round robin sequence should continue, decision 840 branches to "Yes" branch 842, which loops back to select the next run thread (adjust the run thread pointer) and select the next idle thread (adjust the idle thread pointer) at step 845, and add weighting values to the selected threads' fractional PURR accumulators accordingly. This looping continues until distributed round robin sequence terminates, at which point decision 840 branches to "No" branch 848, whereupon processing ends at 850. In one embodiment, processing adds the weighting values included in fractional PURR accumulators 250 to thread PURRs and computes thread utilization values, such as that shown in FIG. 6's step 645-670.

FIG. 9 is a table showing a distributed cycle round robin sequence that adds weighting values to active threads over time. In one embodiment, the distributed cycle round robin sequence uses pointers (one for run threads and one for idle threads) to track which thread to add weighting values for a particular sequence. In this embodiment, a run weighting value (or dispatch run weighting value) and an idle weighting value (or dispatch idle weighting value) are re-computed for each sequence.

Table 900 includes rows 905-940, which correspond to threads 0-7 (column 945). Column 950 shows that seven threads are active (threads 0-6). Column 955 shows that threads 0-2 are in the run state, and threads 3-6 are in the idle state. As such, the run thread pointer cycles through threads 0-2, and the idle thread pointer cycles through threads 3-6.

Columns 960-990 show which thread receives weighting values based upon sequence 1-7, respectively. Since the run thread pointer starts at the first run thread (thread 0), column 960 shows that a run weighting value is added to thread 0's fractional accumulator. Likewise, since the idle thread pointer starts at the first idle thread (thread 3), column 960 shows that the idle weighting value is added to thread 3's fractional accumulator.

During the second sequence (cycle), the run weighting value is added to thread 1's fractional accumulator and the idle weighting value is added to thread 4's fractional accumulator (column 965). The third sequence shows that a dispatch (D) occurs. As such, a dispatch run weighting value is added to thread 2's fractional accumulator and a dispatch idle weighting value is added to thread 5's fractional accumulator (column 970). Since, at the fourth sequence, the run thread pointer was at the last run thread (thread 2), the run thread pointer cycles back to thread 0 and adds the run weighting value to thread 0's fractional accumulator. The idle thread pointer, however, cycles to the next idle thread (thread 6), and adds the idle weighting value to thread 6's fractional accumulator. This process continues over time that, in turn, provides an accurate representation of weighting values between threads 0-6.

In one embodiment that includes only run threads or idle threads, the calculated value may be overridden to a 64 decimal and applied to the active threads. In another embodiment, the distributed cycle round robin sequence is used in single LPAR mode. In this embodiment when a system is in a multi-LPAR mode, each thread is updated each cycle due each LPAR operating independently and simplified charge calculations (see FIG. 4 and corresponding text for further details).

Figure 10:
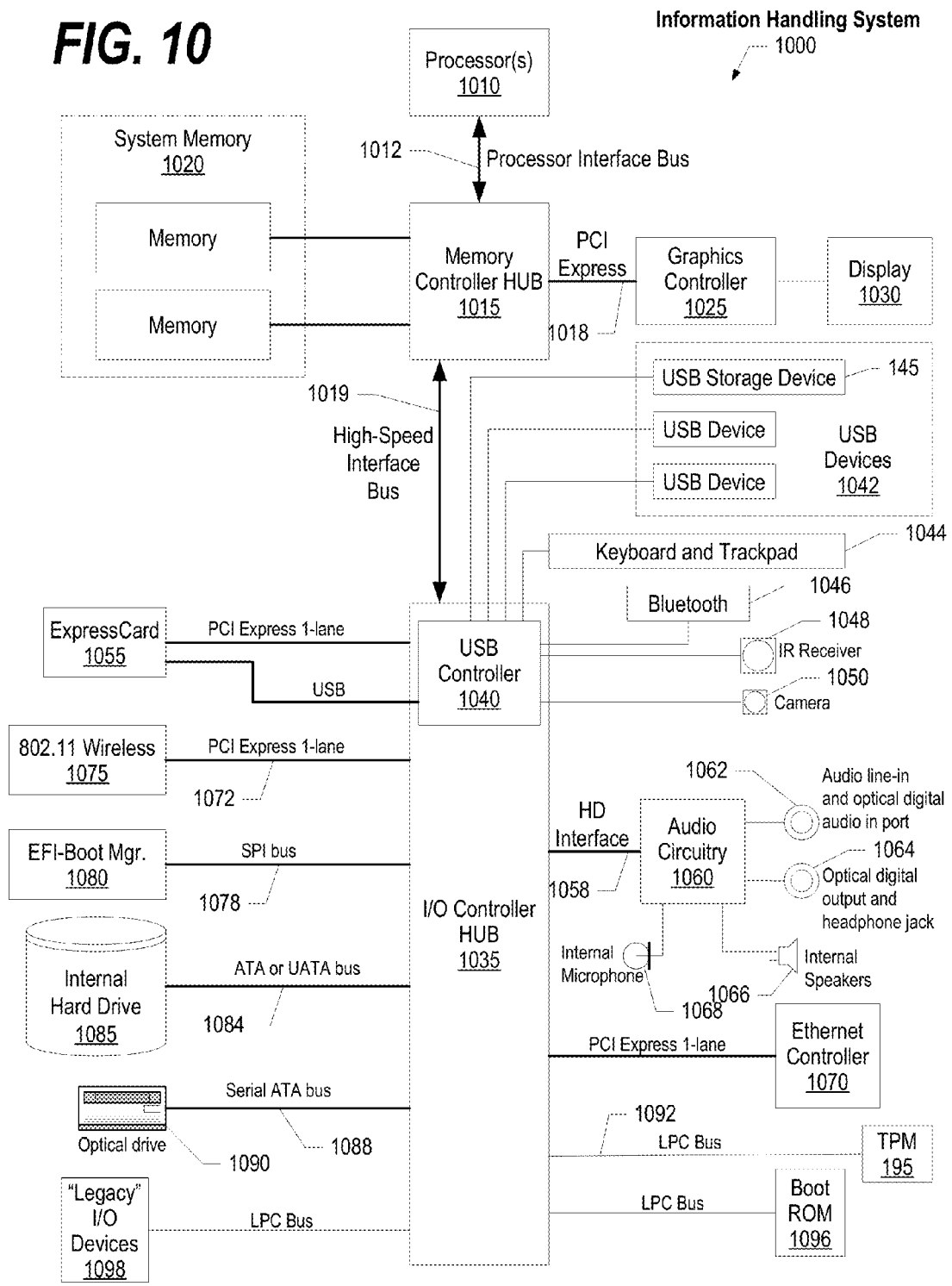
FIG. 10 illustrates a simplified example of a computer system capable of performing the computing operations described herein.

FIG. 10 illustrates information handling system 1000, which is a simplified example of a computer system capable of performing the computing operations described herein. Information handling system 1000 includes one or more processors 1010 coupled to processor interface bus 1012. Processor interface bus 1012 connects processors 1010 to Memory Controller Hub (MCH) 1015. MCH 1015 connects to system memory 1020 and provides a means for processor(s) 1010 to access the system memory. Graphics controller 1025 also connects to MCH 1015. In one embodiment, PCI Express bus 1018 connects MCH 1015 to graphics controller 1025. Graphics controller 1025 connects to display device 1030, such as a computer monitor.

MCH 1015 and I/O Controller Hub (ICH) 1035 connect to each other using bus 1019. In one embodiment, the bus is a high-speed interface bus that transfers data at high speeds in each direction between MCH 1015 and ICH 1035. In another embodiment, a Peripheral Component Interconnect (PCI) bus connects the MCH and the ICH. ICH 1035 is a chip that generally implements capabilities that operate at slower speeds than the capabilities provided by the MCH. ICH 1035 typically provides various busses used to connect various components. These busses include, for example, PCI and PCI Express busses, an ISA bus, a System Management Bus (SM-Bus or SMB), and/or a Low Pin Count (LPC) bus. The LPC bus often connects low-bandwidth devices, such as boot ROM 1096 and "legacy" I/O devices (using a "super I/O" chip). The "legacy" I/O devices (1098) can include, for example, serial and parallel ports, keyboard, mouse, and/or a floppy disk controller. The LPC bus also connects ICH 1035 to Trusted Platform Module (TPM) 1095. Other components often included in ICH 1035 include a Direct Memory Access (DMA) controller, a Programmable Interrupt Controller (PIC), and a storage device controller, which connects ICH 1035 to nonvolatile storage device 1085, such as a hard disk drive, using bus 1084.

ExpressCard 1055 is a slot that connects hot-pluggable devices to the information handling system. ExpressCard 1055 supports both PCI Express and USB connectivity as it connects to ICH 1035 using both the Universal Serial Bus (USB) the PCI Express bus. ICH 1035 includes USB Controller 1040 that provides USB connectivity to devices that connect to the USB. These devices include webcam (camera) 1050, infrared (IR) receiver 1048, keyboard and trackpad 1044, and Bluetooth device 1046, which provides for wireless personal area networks (PANs). USB Controller 1040 also provides USB connectivity to other miscellaneous USB connected devices 1042, such as a mouse, removable nonvolatile storage device 1045, modems, network cards, ISDN connectors, fax, printers, USB hubs, and many other types of USB connected devices. While removable nonvolatile storage device 1045 is shown as a USB-connected device, removable nonvolatile storage device 1045 could be connected using a different interface, such as a Firewire interface, etcetera.

Wireless Local Area Network (LAN) device 1075 connects to ICH 1035 via the PCI or PCI Express bus 1072. LAN device 1075 typically implements one of the IEEE 802.11 standards of over-the-air modulation techniques that all use the same protocol to wireless communicate between information handling system 1000 and another computer system or device. Optical storage device 1090 connects to ICH 1035 using Serial ATA (SATA) bus 1088. Serial ATA adapters and devices communicate over a high-speed serial link. The Serial ATA bus also connects ICH 1035 to other forms of storage devices, such as hard disk drives. Audio circuitry 1060, such as a sound card, connects to ICH 1035 via bus 1058. Audio circuitry 1060 also provides functionality such as audio line-in and optical digital audio in port 1062, optical digital output and headphone jack 1064, internal speakers 1066, and internal microphone 1068. Ethernet controller 1070 connects to ICH 1035 using a bus, such as the PCI or PCI Express bus. Ethernet controller 1070 connects information handling system 1000 to a computer network, such as a Local Area Network (LAN), the Internet, and other public and private computer networks.

While FIG. 10 shows one information handling system, an information handling system may take many forms. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory.

The Trusted Platform Module (TPM 1095) shown in FIG. 10 and described herein to provide security functions is but one example of a hardware security module (HSM). Therefore, the TPM described and claimed herein includes any type of HSM including, but not limited to, hardware security devices that conform to the Trusted Computing Groups (TCG) standard, and entitled "Trusted Platform Module (TPM) Specification Version 1.2." The TPM is a hardware security subsystem that may be incorporated into any number of information handling systems, such as those outlined in FIG. 11.

Figure 11:
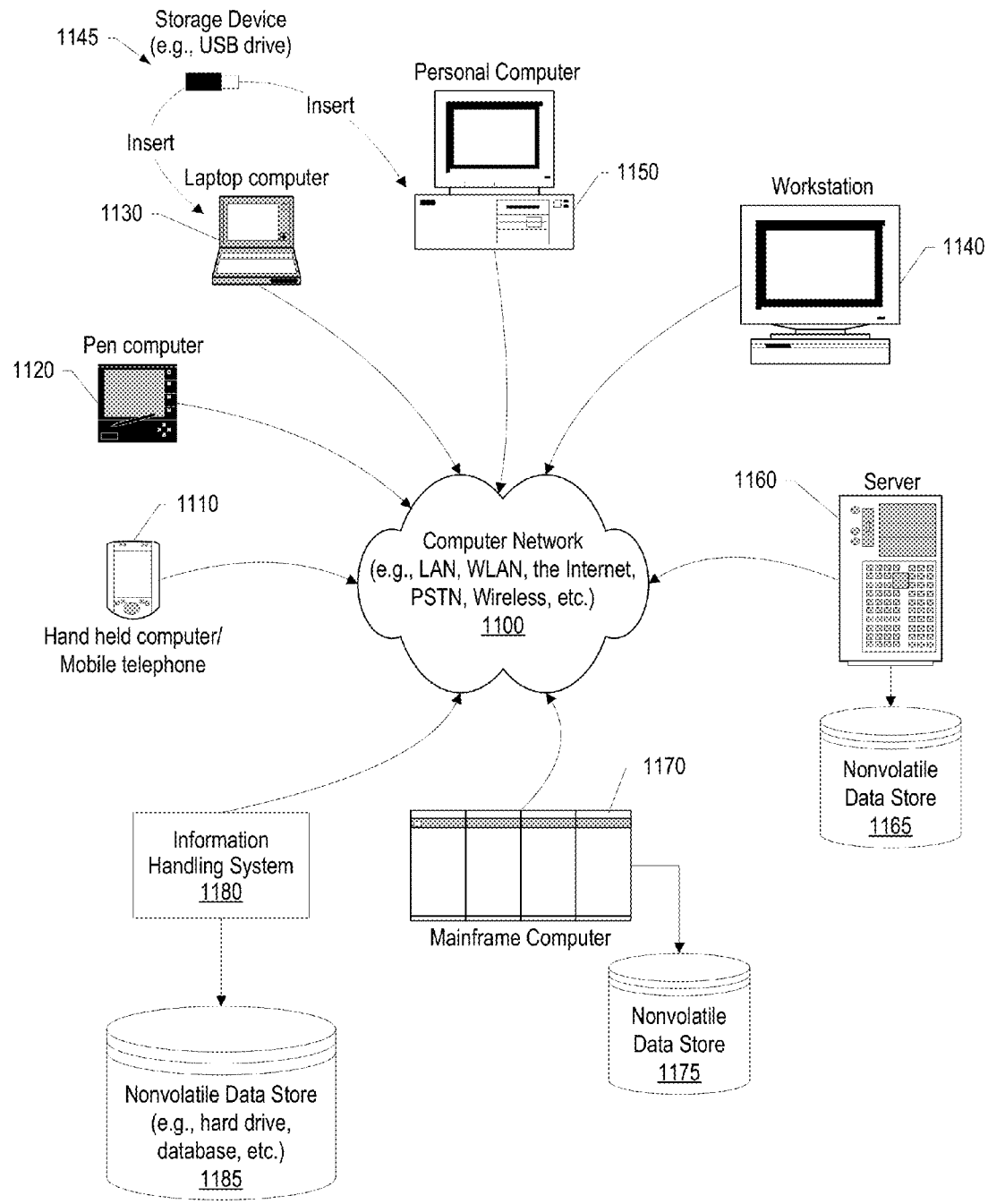
FIG. 11 provides an extension of the information handling system environment shown in FIG. 10 to illustrate that the methods described herein can be performed on a wide variety of information handling systems that operate in a networked environment.

FIG. 11 provides an extension of the information handling system environment shown in FIG. 10 to illustrate that the methods described herein can be performed on a wide variety of information handling systems that operate in a networked environment. Types of information handling systems range from small handheld devices, such as handheld computer/mobile telephone 1110 to large mainframe systems, such as mainframe computer 1170. Examples of handheld computer 1110 include personal digital assistants (PDAs), personal entertainment devices, such as MP3 players, portable televisions, and compact disc players. Other examples of information handling systems include pen, or tablet, computer 1120, laptop, or notebook, computer 1130, workstation 1140, personal computer system 1150, and server 1160. Other types of information handling systems that are not individually shown in FIG. 11 are represented by information handling system 1180. As shown, the various information handling systems can be networked together using computer network 1100. Types of computer network that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems shown in FIG. 11 depicts separate nonvolatile data stores (server 1160 utilizes nonvolatile data store 1165, mainframe computer 1170 utilizes nonvolatile data store 1175, and information handling system 1180 utilizes nonvolatile data store 1185). The nonvolatile data store can be a component that is external to the various information handling systems or can be internal to one of the information handling systems. In addition, removable nonvolatile storage device 1045 can be shared among two or more information handling systems using various techniques, such as connecting the removable nonvolatile storage device 1045 to a USB port or other connector of the information handling systems.

While particular embodiments of the present disclosure have been shown and described, it will be obvious to those skilled in the art that, based upon the teachings herein, that changes and modifications may be made without departing from this disclosure and its broader aspects. Therefore, the appended claims are to encompass within their scope all such changes and modifications as are within the true spirit and scope of this disclosure. Furthermore, it is to be understood that the disclosure is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to disclosures containing only one such element, even when the same claim includes the introductory phrases "one or more" or "at least one" and indefinite articles such as "a" or "an"; the same holds true for the use in the claims of definite articles.

The invention claimed is:

1. An information handling system comprising:
   one or more processors;
   a memory coupled to at least one of the processors;
   computational logic included in at least one of the processors in order to perform actions of:
      selecting a thread from a plurality of active threads on a processor;
      selecting a weighting value according to a thread state of the selected thread and a simultaneous multithreading mode of the information handling system;
      determining whether one of the plurality of threads is dispatching an instruction;
      in response to determining that one of the plurality of threads is dispatching an instruction, computing a dispatch weighting value using the selected weighting value and a dispatch factor, wherein the dispatch factor indicates a weighting adjustment of the selected weighting value; and
      computing a resource utilization value of the selected thread using the computed dispatch weighting value.

2. The information handling system of claim 1 wherein the computational logic performs additional actions comprising:
   multiplying the dispatch factor with the weighting value, resulting in a dispatch fraction; and
   adding the dispatch fraction to the weighting value, resulting in the dispatch weighting value.

3. The information handling system of claim 2 wherein the computational logic performs additional actions comprising:
   determining that the dispatch weighting value exceeds a maximum value; and
   adjusting the dispatch weighting value to equal the maximum value in response to determining that the dispatch weighting value exceeds the maximum value.

4. The information handling system of claim 1 wherein the selected weighting value is stored in one of a plurality of register fields, and wherein the computational logic performs additional actions comprising:
   identifying one of the plurality of register fields based on the thread state, a summary thread context, and the simultaneous multithreading mode, wherein:
      the thread state is selected from the group consisting of an idle state and a run state; and
      the summary thread context corresponds to an amount of active threads included in the plurality of active threads.

5. The information handling system of claim 1 wherein a run thread pointer identifies one of the plurality of active threads in a run state according to a distributed round robin sequence, and wherein the computational logic performs additional actions comprising:
   storing the dispatch weighting value in a fractional accumulator that corresponds to the identified one of the plurality of active threads;
   adjusting the run thread pointer according to the distributed round robin sequence, resulting in the run thread pointer identifying a different one of the plurality of threads in the run state;
   computing a different dispatch weighting value; and
   storing the different dispatch weighting value in a different fractional accumulator that corresponds to the different one of the plurality of threads.

6. The information handling system of claim 1 wherein one of the processors is in a multi-LPAR mode that includes a plurality of logical partitions, and wherein the computational logic performs additional actions comprising:
   identifying one of the plurality of logical partitions that corresponds to the selected thread; and
   selecting the weighting value based upon the identified one of the plurality of logical partitions.

7. The information handling system of claim 1 wherein the weighting values are stored in a region weighted mode register, and wherein the region weighted mode register is devoid of a dispatch weighting value.

8. A computer program product stored in a non-transitory computer readable storage medium, comprising computer program code that, when executed by an information handling system, causes the information handling system to perform actions comprising:
   selecting a thread from a plurality of active threads on a processor;
   selecting a weighting value according to a thread state of the selected thread and a simultaneous multithreading mode of the information handling system;
   determining whether one of the plurality of threads is dispatching an instruction;
   in response to determining that one of the plurality of threads is dispatching an instruction, computing a dispatch weighting value using the selected weighting value and a dispatch factor, wherein the dispatch factor indicates a weighting adjustment of the selected weighting value; and
   computing a resource utilization value of the selected thread using the computed dispatch weighting value.

9. The computer program product of claim 8 wherein the information handling system performs further actions comprising:
   multiplying the dispatch factor with the weighting value, resulting in a dispatch fraction; and
   adding the dispatch fraction to the weighting value, resulting in the dispatch weighting value.

10. The computer program product of claim 9 wherein the information handling system performs further actions comprising:
    determining that the dispatch weighting value exceeds a maximum value; and
    adjusting the dispatch weighting value to equal the maximum value in response to determining that the dispatch weighting value exceeds the maximum value.

11. The computer program product of claim 8 wherein the selected weighting value is stored in one of a plurality of register fields, and wherein the information handling system performs further actions comprising:
    identifying one of the plurality of register fields based on the thread state, a summary thread context, and the simultaneous multithreading mode, wherein:
       the thread state is selected from the group consisting of an idle state and a run state; and
       the summary thread context corresponds to an amount of active threads included in the plurality of active threads.

12. The computer program product of claim 8 wherein a run thread pointer identifies one of the plurality of active threads in a run state according to a distributed round robin sequence, and wherein the information handling system performs further actions comprising:
    storing the dispatch weighting value in a fractional accumulator that corresponds to the identified one of the plurality of active threads;

adjusting the run thread pointer according to the distributed round robin sequence, resulting in the run thread pointer identifying a different one of the plurality of threads in the run state;

computing a different dispatch weighting value; and storing the different dispatch weighting value in a different fractional accumulator that corresponds to the different one of the plurality of threads.

13. The computer program product of claim 8 wherein the processor is in a multi-LPAR mode that includes a plurality of logical partitions, and wherein the information handling system performs further actions comprising:

identifying one of the plurality of logical partitions that corresponds to the selected thread; and selecting the weighting value based upon the identified one of the plurality of logical partitions.

14. The computer program product of claim 8 wherein the weighting values are stored in a region weighted mode register, and wherein the region weighted mode register is devoid of a dispatch weighting value.

15. A method implemented by an information handling system that includes a memory and a processor, the method comprising:

selecting a thread from a plurality of active threads on the processor;

selecting a weighting value according to a thread state of the selected thread and a simultaneous multithreading mode of the information handling system;

determining whether one of the plurality of threads is dispatching an instruction;

in response to determining that one of the plurality of threads is dispatching an instruction, computing a dispatch weighting value using the selected weighting value and a dispatch factor, wherein the dispatch factor indicates a weighting adjustment of the selected weighting value; and computing a resource utilization value of the selected thread using the computed dispatch weighting value.

16. The method of claim 15 further comprising:

multiplying the dispatch factor with the weighting value, resulting in a dispatch fraction; and adding the dispatch fraction to the weighting value, resulting in the dispatch weighting value.

17. The method of claim 16 further comprising:

determining that the dispatch weighting value exceeds a maximum value; and adjusting the dispatch weighting value to equal the maximum value in response to determining that the dispatch weighting value exceeds the maximum value.

18. The method of claim 15 wherein the selected weighting value is stored in one of a plurality of register fields, the method further comprising:

identifying one of the plurality of register fields based on the thread state, a summary thread context, and the simultaneous multithreading mode, wherein:

the thread state is selected from the group consisting of an idle state and a run state; and the summary thread context corresponds to an amount of active threads included in the plurality of active threads.

19. The method of claim 15 wherein a run thread pointer identifies one of the plurality of active threads in a run state according to a distributed round robin sequence, the method further comprising:

storing the dispatch weighting value in a fractional accumulator that corresponds to the identified one of the plurality of active threads;

adjusting the run thread pointer according to the distributed round robin sequence, resulting in the run thread pointer identifying a different one of the plurality of threads in the run state;

computing a different dispatch weighting value; and storing the different dispatch weighting value in a different fractional accumulator that corresponds to the different one of the plurality of threads.

20. The method of claim 15 wherein one of the processors is in a multi-LPAR mode that includes a plurality of logical partitions, the method further comprising:

identifying one of the plurality of logical partitions that corresponds to the selected thread; and selecting the weighting value based upon the identified one of the plurality of logical partitions.

21. The method of claim 15 wherein the weighting values are stored in a region weighted mode register, and wherein the region weighted mode register is devoid of a dispatch weighting value.

* * * * *